United States Patent [19]

Watari

[11] Patent Number: 4,901,352

[45] Date of Patent: Feb. 13, 1990

[54] PATTERN MATCHING METHOD USING RESTRICTED MATCHING PATHS AND APPARATUS THEREFOR

[75] Inventor: Masao Watari, Tokyo, Japan

[73] Assignee: NEC Corporation, Tokyo, Japan

[21] Appl. No.: 719,603

[22] Filed: Apr. 3, 1985

[30] Foreign Application Priority Data

Apr. 5, 1984 [JP] Japan .................................. 59-68015

[51] Int. Cl.$^4$ .............................................. G10L 7/08
[52] U.S. Cl. ...................................................... 381/43
[58] Field of Search .................................... 381/41–43, 381/44–46; 364/513.5

[56] References Cited

U.S. PATENT DOCUMENTS

| | | | |
|---|---|---|---|
| 4,059,725 | 11/1977 | Sakoe | 364/513.5 |
| 4,326,101 | 4/1982 | Sakoe | 364/513.5 |
| 4,349,700 | 9/1982 | Pirz et al. | 364/513.5 |
| 4,400,788 | 8/1983 | Myers et al. | 381/43 |
| 4,513,436 | 4/1985 | Nose et al. | 381/43 |
| 4,530,110 | 7/1985 | Nojiri et al. | 364/513.5 |
| 4,555,796 | 11/1985 | Sakoe | 381/43 |
| 4,570,232 | 2/1986 | Shikano | 381/43 |
| 4,592,086 | 5/1986 | Watari et al. | 381/43 |
| 4,667,341 | 5/1987 | Watari | 364/513.5 |

Primary Examiner—David L. Clark
Assistant Examiner—John A. Merecki
Attorney, Agent, or Firm—Sughrue, Mion, Zinn, Macpeak & Seas

[57] ABSTRACT

Pattern matching, for speech recognition, wherein distances are determined between the input pattern and many reference patterns. However the distances are determined with the reference pattern at a time slant to the input pattern and the determination is repeated for different starting values of the input patterns. Dynamic programming (DP) matching is conducted based on these distances. Boundary conditions may be determined for different starting values independent of other starting values because allowed paths do not reverse directions on the scale of the gradations.

4 Claims, 5 Drawing Sheets

PATTERN MATCHING METHOD USING RESTRICTED MATCHING PATHS AND APPARATUS THEREFOR

BACKGROUND OF THE INVENTION:

The present invention relates to a pattern matching method and apparatus useful for recognizing an input string of spoken words and, more particularly, to a speech recognizing apparatus of high recognition accuracy for recognizing at a high speed an input string of words which are continuously uttered in compliance with a regular grammar program.

A variety of improvements in the reduction of calculation steps for speech recognition based on the DP matching performing a time normalizing have been proposed in the aspect of responsiveness. For example, Cory S. Meyers and Lawrence R. Rabiner have contemplated reduction of the calculation quantity by executing the DP matching algorithm between an input pattern and a reference pattern at each digit. Reference should be made to "A Level Building Dynamic Time Warping Algorithm for Connected Word Recognition", IEEE TRANSACTIONS ON ACOUSTICS, SPEECH, AND SIGNAL PROCESSING. VOL. ASSP-29, No. 2, APRIL 1981, pp, 284–297. On the other hand, there has been proposed by the present inventor and another a system for eliminating the problem intrinsic to the system of Myers et al., i.e., the slow responsiveness due to the DP matching processing in the direction of the reference pattern time axis. According to this system (U.S. patent application Ser. No. 447,829, now matured into U.S. Pat. No. 4,592,086, and European Patent Publication No. 0 081 390), the responsiveness is improved by conducting the matching algorithm processing in an input pattern time axis (which is called the "clockwise processing" and will be referred to as a "first technique").

We have also proposed (in U.S. patent application Ser. No. 664,732) a system (which will be referred to as a "second technique") for drastically reducing the access time to a memory (i.e., the calculation time) by conducting the calculations for each block having a predetermined width in an input pattern time axis.

Of the speech recognizing apparatus, an apparatus for recognizing an input string of words which are uttered in compliance with the regular grammar can be used for a wide range of applications such as computer programs, limited business documents, directions for air planes and control instructions of various devices. It is a known principle that an erroneous recognition can be reduced by making use of the grammatical rules. Especially for continuous digit recognition where the number of digits of an input speech is restricted, the recognition accuracy can be improved by regulating the restrictions.

A method for recognizing an input string of spoken words in compliance with the grammar on the basis of the first technique has been proposed by Sakoe (U.S. patent application Ser. No. 448,088, now matured into U.S. Pat. No. 4,555,796, and European Patent Publication No. 0·082 000). On the basis of the second technique, the speech of that type can be recognized, but the following problem arises. If the second technique is used, the grammar is expressed by an automation $\alpha$, which is defined by:

$$\alpha = <K, \Sigma, \Delta, P_0, F> \qquad (1)$$

where

K: a set of states $p\{p | p=1, 2, \ldots, \pi\}$;
$\epsilon$: a set of reference words $n\{n | n=1, 2, \ldots, N\}$;
$\Delta$: a state transition table $\{(p, q, n)\}$, in which a combination $(p, q, n)$ represents a state transition of $$p \xrightarrow{n} q;$$

$P_0$: an initial state, and later $p=0$; and
F: a set of final states $F \epsilon K$.

A speech pattern A obtained by continuously uttering a plurality of words $n \epsilon \Sigma$ according to the automaton $\alpha$ will be called an (unknown) input pattern and is expressed by:

$$A = a_1, a_2, \ldots, a_i, \ldots, a_I \qquad (2).$$

For each word $n \epsilon \Sigma$, the following reference pattern is prepared and will be called a "word reference pattern":

$$B^n = b_1^n, b_2^n, \ldots, b_j^n, \ldots, b_{J^n}^n \qquad (3).$$

A string of speech reference patterns $C = B^{n1}, B^{n2}, \ldots, B^{nx}$, which is obtained by connecting word reference pattern $B^n$ in compliance with the automaton $\alpha$, is subjected to the DP matching with the input pattern A to calculate a quantity (which will be called a "dissimilarity" and is expressed by $g(m, j)$) representing the difference between those two patterns, and a word string giving the minimum dissimilarity is accepted as the result of recognition. Here, the dissimilarity $g(m, j)$ is an accumulated distance at the time m of the input pattern to the time j of the reference pattern.

Now, the minimum dissimilarity is determined by the following dynamic programming technique: The initial condition is set as:

$$\left. \begin{array}{l} T(0, 0) = 0; \\ T(m, q) = \infty, m \neq 0, q \neq 0; \text{ and} \\ G(p, n, j) = \infty, \end{array} \right\} \qquad (4)$$

and asymptotic equations (7) are calculated for $i=1$ to I/IL (wherein I/IL is assumed to be integrally divisible for simplicity of discussion) and for all the pairs (p, n) of (p, q, n)$\epsilon \Delta$ consecutively on the basis of boundary conditions of equations (5) and (6). Here T(m, q) represents either the minimum accumulated distance at the end time (or frame) $J^n$ of all the reference pattern words n that reach the state q at the time m of the input pattern or the initial value at the time m in the state q; and G(p, n, j) represents the accumulated distance at the time j of the reference pattern on the boundary between a one-preceding block and the present block in the procedure for determining the accumulated distance of the reference pattern words n started from the state p. Specifically the boundary conditions are given by:

$$g(m-1, 0) = T(m-1, p), m = m_s, \ldots, m_e; \quad (5)$$
$$h(m-1, 0) = m-1, m = m_s, \ldots, m_e,$$
where
$$m_s = (i-1) \cdot IL + 1, m_e = i \cdot IL;$$

and $$g(m_s - 1, j) = G(p, n, j), j = 1, \ldots, J^n; \quad (6)$$
$$h(m_s - 1, j) = H(p, n, j), j = 1, \ldots, J^n,$$

and the asymptotic equations are given by:

$$g(m, j) = d(m, j) + g(m-1, \hat{j}); \text{ and} \quad (7)$$
$$h(m, j) = h(m-1, \hat{j})$$

where $$d(m, j) = \text{Dis}(a_m, b_j^n) = \sum_{r=1}^{R} |a_{mr} - b_{jr}^n|; \quad (7I)$$

$$\hat{j} = \underset{j-2 \leq j' \leq j}{\text{argmin}} g(m-1, j').$$

The asymptotic equations (7) are calculated from the time $m=m_s$ to $m_e$ and then from the time $j=1$ to $J^n$. Here $h(m, j)$ represents the path value (or pointer at $(m, j)$ from which best path to $(m, j)$ came) at the time $m$ of the input pattern and at the time $j$ of the reference pattern; and $H(p, n, j)$ represents the path value of the reference pattern at the time $j$ on the boundary between the one-preceding block and the present block in the procedure for determining the accumulated distance of the reference pattern word $n$ started from the state $p$.

After the calculation of one block is completed, the values $g(m_e, j)$ and $h(m_e, j)$ are stored in the table memories $G(p, n, j)$ and $H(p, n, j)$, respectively. Here, $$\underset{x \in X}{\text{argmin}}$$

y means the value $x$ of $x \in X$, which minimizes the value $y$ under the condition $x \in X$.

Next, the minimization of the word at the boundary, the following calculations are conducted:

$$\begin{array}{ll} \text{if} & T(m, q) > g(m, J^n), \\ \text{then} & T(m, q) = g(m, J^n), \\ & N(m, q) = n, \\ & P(m, q) = p, \text{ and} \\ & L(m, q) = h(m, J^n), \\ \text{where} & m = m_s, \ldots, m_e. \end{array} \quad (8)$$

Here, the values $N(m, q)$, $P(m, q)$ and $L(m, q)$ represent; the word number $n$ which gives the minimum accumulated distance for the reference pattern word $n$ having reached the state $q$ at the input pattern time $m$; the state $p$ in which the word $n$ having given the minimum is started; and the word path value $h(m, J^n)$ (i.e., the time of the input pattern corresponding to the input pattern time of the start time of the word $n$) of the reference pattern having given the minimum. In other words, the asymptotic equations (7) are calculated for each pair $(p, n)$ of the IL frame of the input pattern, and these calculations of one column block are performed along the input pattern axis until the end $m=I$.

The recognition result of the input pattern is obtained in a decision process as follows for the recognition of word number $\hat{n}$, the start time $\hat{l}$ of the recognition word $\hat{n}$, and the state $q$ in which the recognition word $\hat{n}$ is started:

$$\text{Initial Condition: } \hat{q} = \underset{q \in F}{\text{argmin}}[T(I, q)] \quad (9)$$

$$q = \hat{q}, m = I \quad (10)$$

$$\begin{array}{ll} \text{Recognition Word:} & \hat{n} = N(m, q); \\ \text{Word Start Point:} & \hat{l} = L(m, q) \\ \text{State Transition:} & \hat{q} = P(m, q). \end{array} \quad (11)$$

If $\hat{l} > 0$, the equations (11) are repeated for $q = \hat{q}$ and $m = \hat{l}$. If $\hat{l} = 0$, the calculations are ended.

Thus, the calculations of the asymptotic equations of one column block may be repeated IL/I times. As compared with the method of repeating the calculations of the asymptotic equations of one column block I times in accordance with the first technique, the number of read and write times of the table memories $G(p, n, j)$ and $H(p, n, j)$ is reduced to 1/IL so that the memory access time can be shortened.

In case loops are included in the state transition of the automaton, however, the correct result cannot be attained because of an inconsistency that the result $T(m, p) = g(m, J^n), m = m_s, \ldots, m_e - 1$ at the word end of the asymptotic calculations of one column block in the state $p$ is used as the initial value $g(m-1, 0) = T(m-1, p), m = m_s + 1, \ldots, m_e$ of the asymptotic calculations in the state $p$ of itself. There is also disclosed in the second technique a method of calculating the boundary conditions, i.e., the table memories $T(m, q)$, $N(m, q)$, $P(m, q)$ and $L(m, q)$ only at the point of the time $m = i \cdot IL = m_e$. This method is advantageous in that the loops may be contained in the state transition of the automaton. According to this method, however, the precision for determining the boundary between the words is worse, thus causing erroneous recognitions because the calculations of the boundary conditions are conducted at coarse intervals.

As has been described hereinbefore, the methods according to the prior art have a defect that the loops cannot be contained in the automaton state transition or that the loops contained deteriorate the time precision for the word boundary determination so that the number of erroneous recognitions are increased.

SUMMARY OF THE INVENTION:

An object of the present invention is to provide a pattern matching method and apparatus which can recognize at a high accuracy and at a high speed an input string of words spoken in compliance with various grammars.

Another object of the present invention is to provide a pattern matching method and apparatus which can process the DP matching at a high speed.

Still another object of the present invention is to provide a pattern matching method and apparatus with less transfer of pattern data and with a lower capacity for pattern buffer memories.

According to the present invention, there is provided pattern matching method or apparatus comprising: a step of determining a distance $d(m, j)$ between each feature vector $b_j^n$ of each of first through N-th reference patterns and a feature vector $a_m$ of an input pattern at each point $(m, j)$ in an i-th slant block defined as a parallelogram which has a first side along an input pattern time axis equal to a block width IL and a second side inclined with respect to a time axis of said reference pattern and to said input pattern time axis, said block width being defined by a predetermined number of time points of said input pattern and being not longer than a length I of said input pattern, said input pattern being represented by a train of feature vectors arranged at said time points respectively, an n-th reference pattern having a length $j^n$ and being represented by a train of feature vectors arranged at time points j, where said n-th reference pattern is each of said first through said N-th reference patterns, and i being a block number ranging $1 \leq i \leq I/IL$ wherein IL indicates said block width, a step of conducting DP (dynamic programming) matching calculations for each of said slant blocks; and a step of setting boundary values at a slant line between an i-th slant block and an (i+1)th slant block as values which have been obtained by said DP matching calculations for the i-th slant block. Other objects and features will be apparent from the following description with reference to the drawings.

DETAILED DESCRIPTION OF THE PREFERRED EMBODIMENTS:

First of all, the principle of the present invention will be described with reference to FIGS. 1 and 2.

Figure 1:
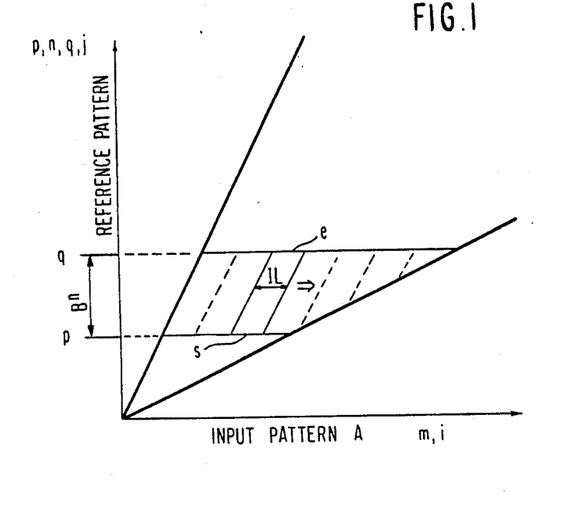
FIGS. 1 and 2 are diagrams for explaining the principle of the present invention.

According to the present invention, the calculations of the foregoing asymptotic equations (7) are conducted, as shown in FIG. 1, by dividing the IL frame of the input pattern into blocks and by calculating the asymptotic equations (7) for each of the inclined blocks (called slant blocks hereinafter). Specifically, the calculations are conducted by the following dynamic programming method. The initial conditions are set as:

$$\left.\begin{array}{l} T(0, 0) = 0; \\ T(m, q) = \infty, m \neq 0, q \neq 0; \text{ and} \\ G(p, n, j) = \infty. \end{array}\right\} \quad (12)$$

With these initial conditions, the following asymptotic equations (15) are calculated for all the pairs (p, n) of (p, q, n) $\in \Delta$ consecutively from i=1 to I/IL (where I/IL is assumed to be integrally divisible for simplicity of discussion) on the basis of the boundary conditions expressed by the following equations (13) and (14). More specifically, the boundary conditions are set by:

$$\left.\begin{array}{l} g(m - 1, 0) = T(m - 1, p), m = m_{so}, \ldots, m_{eo}; \\ h(m - 1, 0) = m - 1, m = m_{so}, \ldots, m_{eo}, \\ \text{where} \\ m_{so} = (i - 1) \cdot IL + 1, m_{eo} = i \cdot IL. \end{array}\right\} \quad (13)$$

The start time $m_{sj}$ and end time $m_{ej}$ of the inclined block at the reference pattern time j are determined by:

$$m_{sj} = m_{so} + [j \cdot GR]; \text{ and}$$

$$m_{ej} = m_{sj} + IL - 1.$$

where [x] represents the maximum integer smaller than x.

Other boundary conditions are set by:

$$\left.\begin{array}{l} g(m_{sj} - 1, j) = G(p, n, j), \\ h(m_{sj} - 1, j) = H(p, n, j). \end{array}\right\} \quad (14)$$

The following asymptotic equations are calculated from the time $m = m_{sj}$ to $m_{ej}$:

$$\left.\begin{array}{l} g(m, j) = d(m, j) + g(m - 1, \hat{j}); \text{ and} \\ h(m, j) = h(m - 1, \hat{j}) \\ \text{where} \\ d(m, j) = \text{Dis}(a_m, b_j^n), \\ \hat{j} = \underset{j - 2 \leq j' \leq j}{\text{argmin}} \, g(m - 1, j'). \end{array}\right\} \quad (15)$$

The boundary values $g(m_{ej}, j)$ and $h(m_{ej}, j)$ are stored in the table memories $G(p, n, j)$ and $H(p, n, j)$.

After the calculations of the equations (15) are completed up to the reference pattern time $j = j^n$, the following calculations are conducted for minimization at the word boundary:

$$\left.\begin{array}{l} \text{if} \quad T(m, q) > g(m, J^n), \\ \text{then} \quad T(m, q) = g(m, J^n), \\ \quad N(m, q) = n, \\ \quad P(m, q) = p, \text{ and} \\ \quad L(m, q) = h(m, J^n), \\ \text{where} \quad m = m_s, \ldots, m_e, \\ \quad m_s = m_{so} + [J^n \cdot GR], \text{ and} \\ \quad m_e = m_s + IL - 1. \end{array}\right\} \quad (16)$$

The recognition result of the input pattern is determined from the equations (9), (10) and (11) like the aforementioned conventional method.

In the present invention, the calculations of the asymptotic equations are executed for each slant block.

The reason why the calculations can be executed for the slant block will be described in the following.

Figure 2:
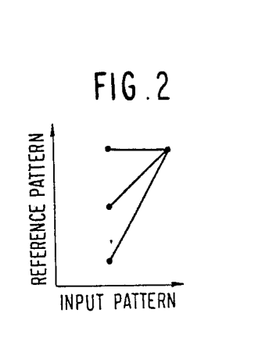

Since the DP matching path is restricted to the three paths shown in FIG. 2, the three paths do not enter the slant block after they go out or vice versa, provided the measure GR indicating the gradient is defined by:

$$0 \leq GR \leq \tfrac{1}{2}. \qquad (17)$$

In other words, the asymptotic calculations of the DP matching can be sequentially processed block by block.

In case there is a loop in the automaton state transition, on the other hand, there arises an inconsistency that the initial value of the asymptotic calculation of the slant block is replaced by the calculated result, if the slant block has its end section (as indicated at e in FIG. 1) superposed on its start section (as indicated at s in FIG. 1). Therefore, it is necessary to prevent the end section and the start section from being superposed on the input pattern time axis. In other words, it is necessary to adopt the block width IL, as is expressed by:

$$\min_n [J^n \cdot GR] + 1 > IL. \qquad (18)$$

Here, $GR = \tfrac{1}{2}$ and $IL = 5$, in case the minimum number of the frames of the reference pattern in set at 10.

Next, the embodiments of the present invention will be described in the following with reference to FIGS. 3 to 9.

Figure 3:
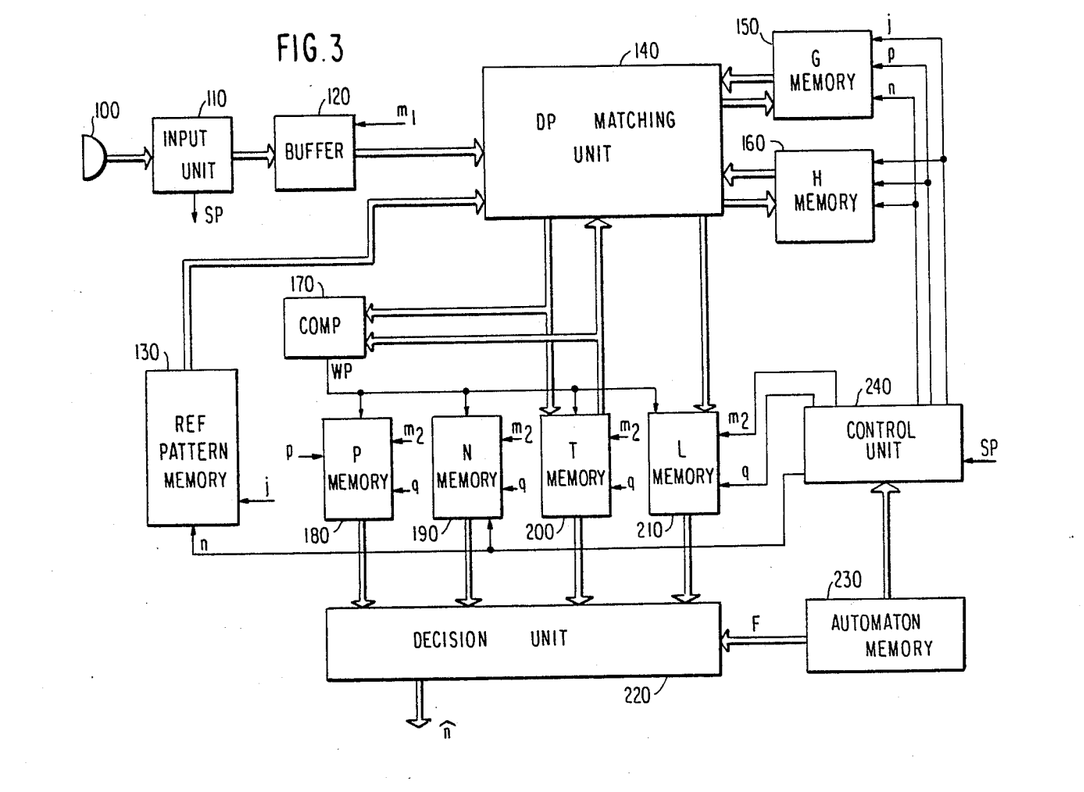
FIG. 3 is a block diagram showing a spoken word string recognizing apparatus according to one embodiment of the present invention.
Figures 4, 5, 6:
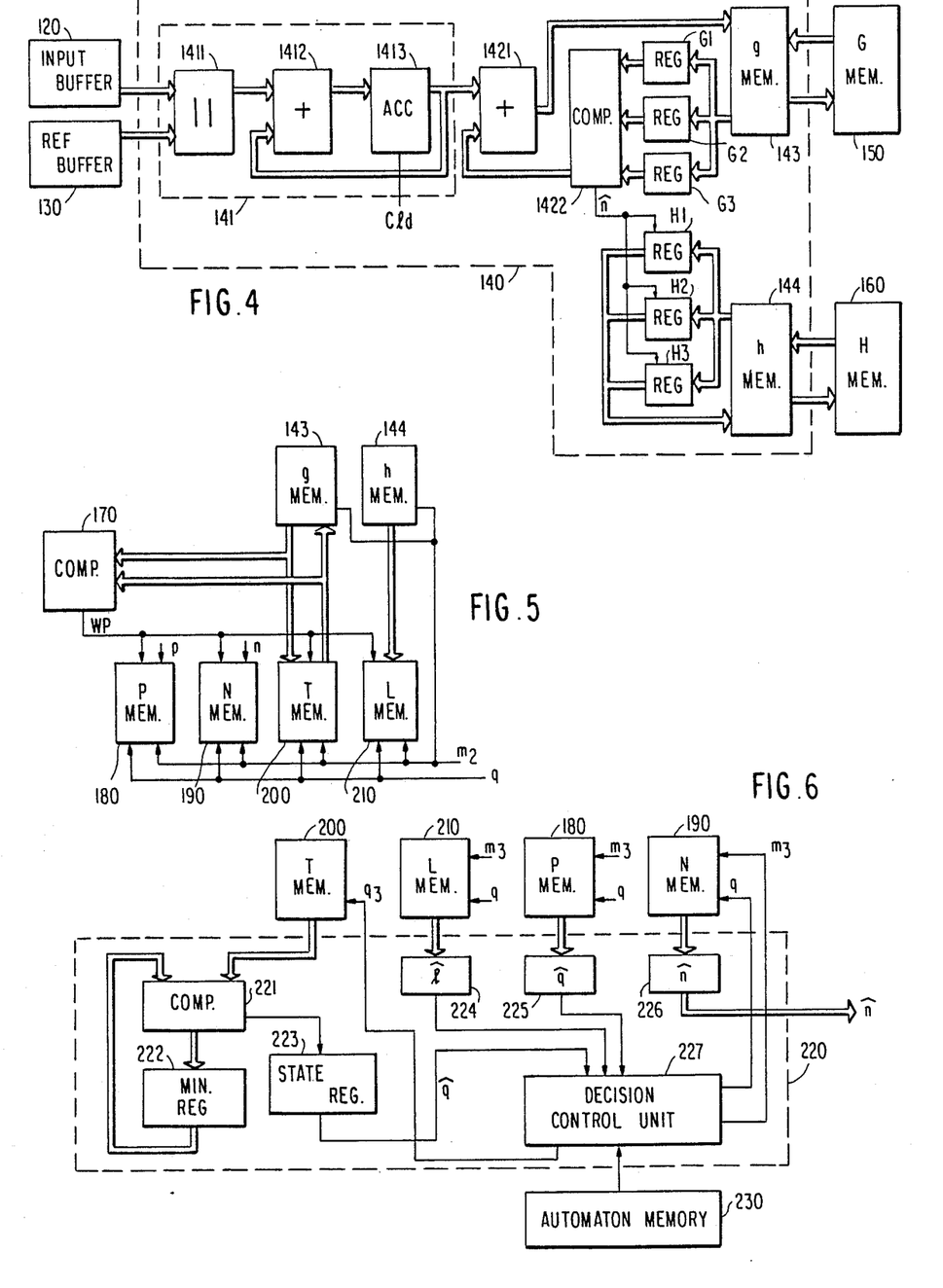
FIGS. 4, 5 and 6 are partial block diagrams showing the detailed construction of the apparatus shown in FIG. 3.
Figure 7:
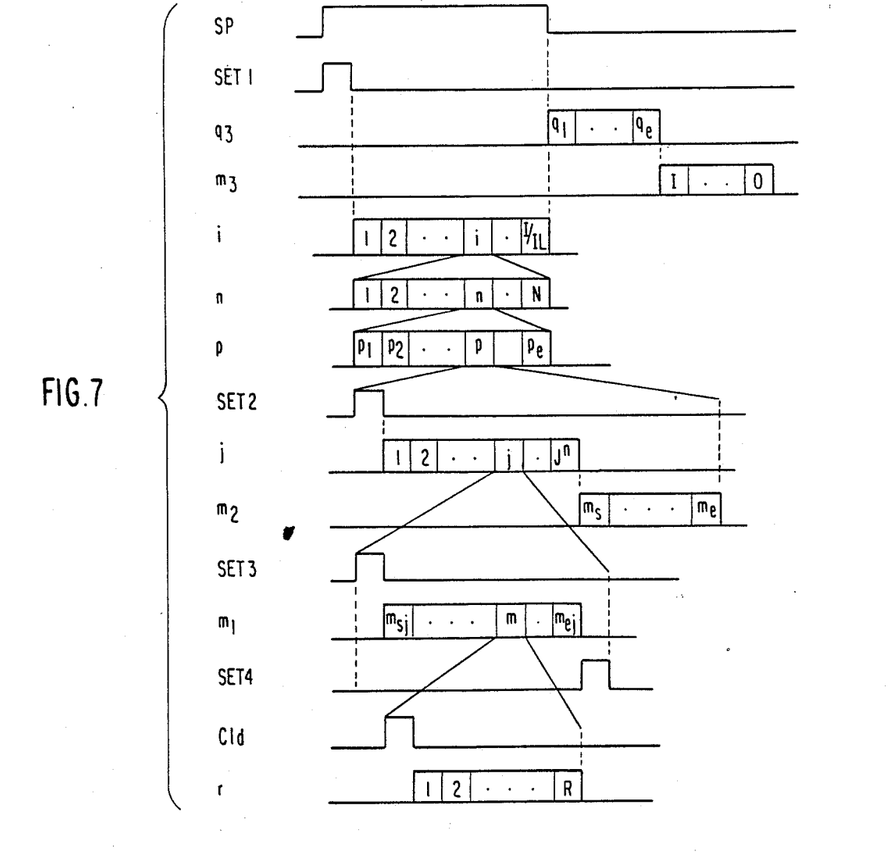
FIG. 7 is a timing chart showing the signals of respective units for explaining the operations of the apparatus shown in FIG. 3.
Figure 8A:
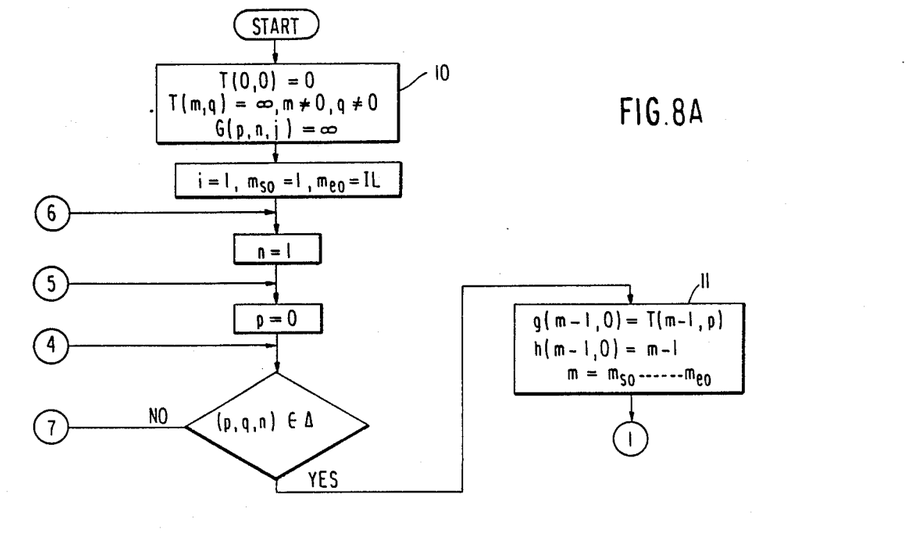
FIGS. 8A to 8D are flow charts showing the flows of the operations of FIGS. 3 to 6.
Figure 8B:
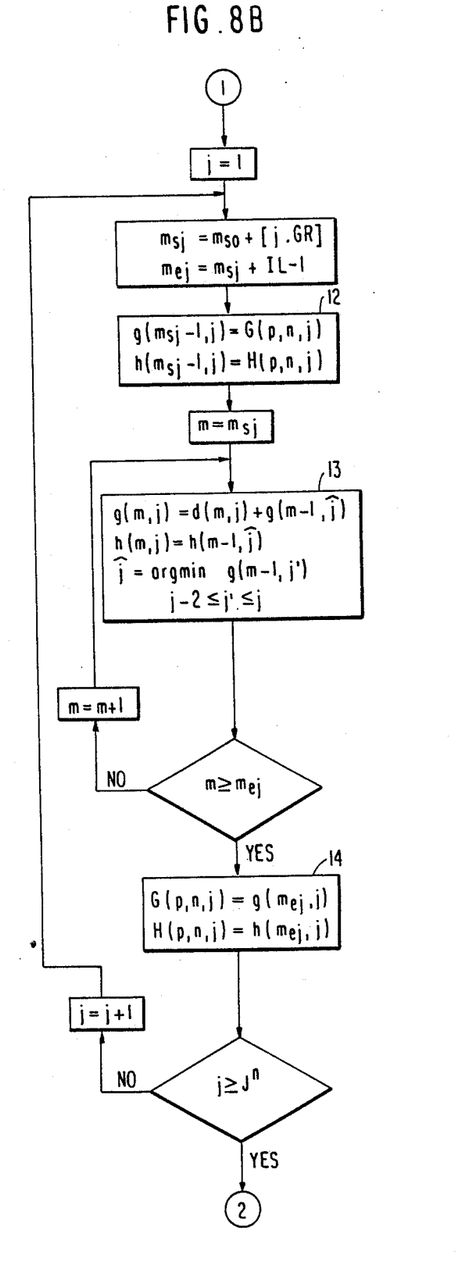
Figure 8C:
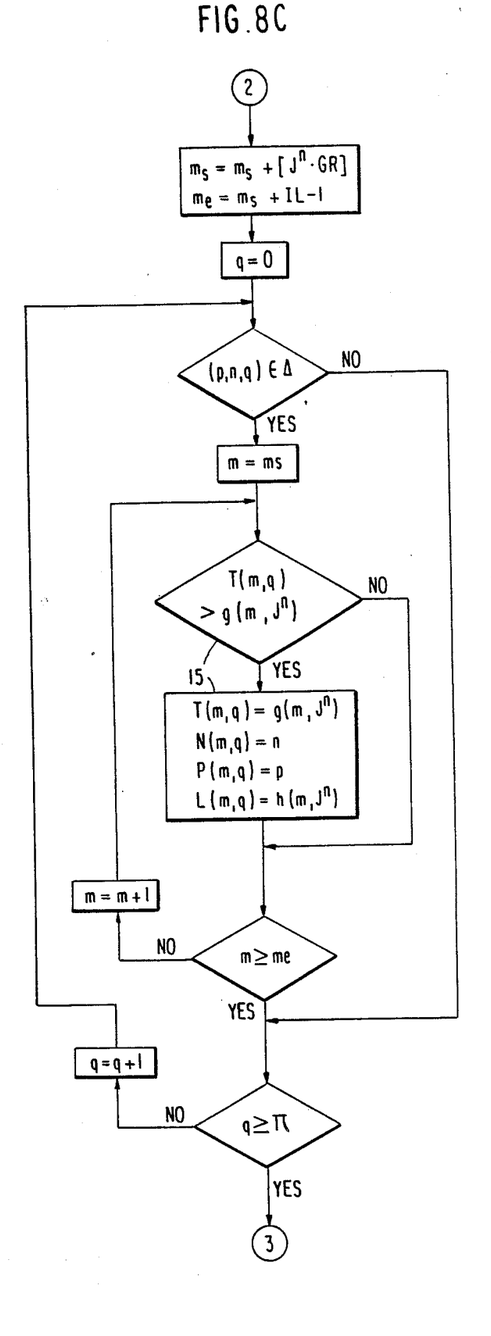
Figure 8D:
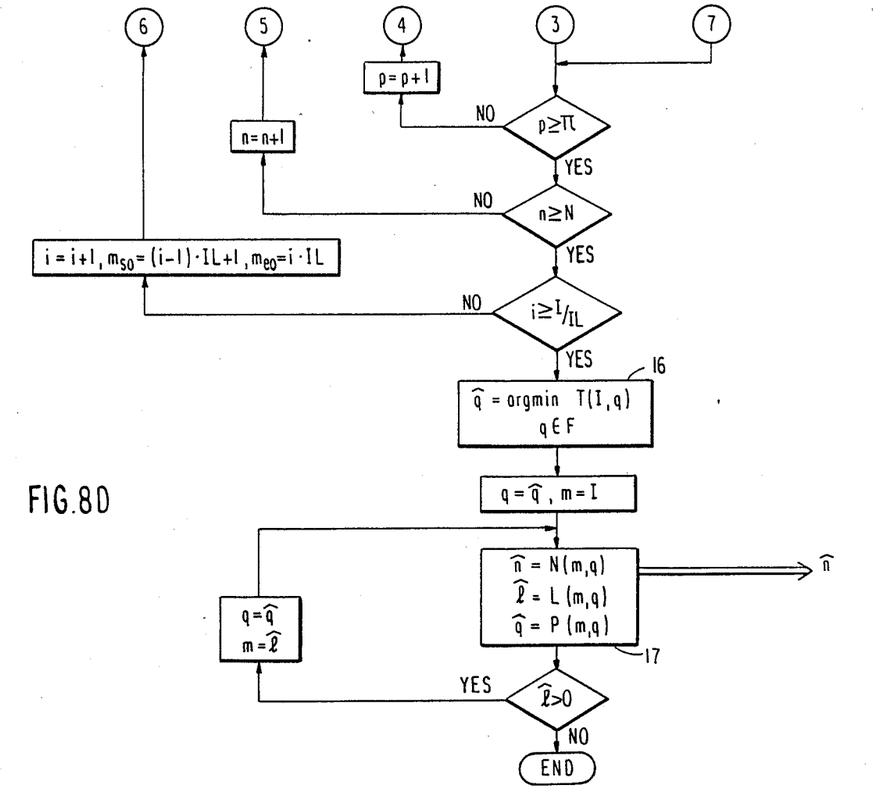
Figure 9A:
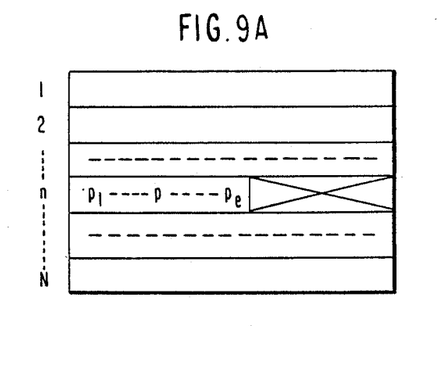
FIGS. 9A and 9B are diagrams showing examples of the memory structures of the automaton memory.
Figure 9B:
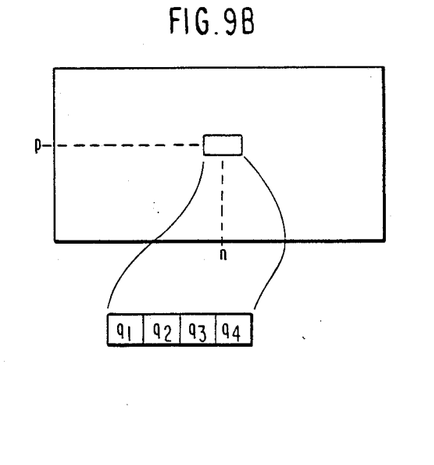

FIG. 3 is a block diagram showing a spoken word string recognizing apparatus according to one embodiment of the present invention. FIGS. 4, 5 and 6 are partial block diagrams showing the detailed construction of the apparatus shown in FIG. 3. FIG. 7 is a timing chart showing the signals of respective units for explaining the operations of the apparatus shown in FIG. 3. FIGS. 8A to 8D are flow charts showing the sequence of the operations of FIGS. 3 to 6. FIGS. 9A and 9B are diagrams showing examples of the memory structures of the automaton memory.

A reference pattern memory 130 has stored therein the reference pattern $B^n$ of each word n contained in a word set $\Sigma$. An automaton memory 230 is stored with the state transition table and the end state designating data. In the present embodiment, the state transition table is stored as is shown in FIGS. 9A and 9B. FIG. 9A is called an "automaton table" and designates a set of the states p which are allowed in the state transition $p \rightarrow q$ by the word n. The same Figure exemplifies that the set of $p_1, \ldots, p, \ldots, p_3$ can be established as the state p for the word n. FIG. 9B is called a "transition table" and shows the storage of the set of the states q which can be transitioned from the state p by the word n.

When an unknown input speech is inputted from a microphone 100, its frequency is analyzed by an input unit 110 and converted into a feature vector $a_i$, which is consecutively fed to an input pattern buffer 120. Moreover, the input unit 110 has a function of determining whether speech is present in the present section of time by detecting the speech level and it generates a speech detection signal SP which takes a value "1" in a non-speech section and "0" in a speech section. A control unit 240 generates an initializing pulse SET1 at the rising time of that speech detection signal SP. As a result, an initialization for a block 10 of FIG. 8A is conducted for a G memory 150 and a T memory 200.

After this initialization, the input pattern block signal i is counted at 1, 2 and so on in synchronism with the input of the feature input $a_i$ of the subsequent IL frames. In this input pattern block i, the word designating signal n from the control unit 240 is sequenced from 1 to N. In each word n, the state designating signal p is sequenced from $P_1$ to $p_e$ with reference to the automaton table in the automaton memory 230. Also outputted is the state designating signal q which is specified by that word n and the state p.

Next, the operations of one cycle with the word n and the state p will be described. In this one cycle, the calculations of one slant block shown in FIG. 1 are executed. Specifically, the foregoing equations (15) and (16) are calculated under the boundary conditions of the foregoing equations (13) and (14). At first, in response to a signal SET2 from the control unit 240, values corresponding to a block 11 of FIG. 8A are set for a g memory 143 and an h memory 144 in a DP matching unit 140 and detailed in FIGS. 4 and 5. Subsequently, the reference pattern time signal j from the control unit 240 is sequenced from 1 to $J^n$. At each reference pattern time j, the setting of the boundary value with the (i−1)-th slant block, as shown in a block 12 in FIG. 8B, is first conducted in response to a signal SET3 from the control unit 240. Then, the input pattern time signal m is sequenced from $m_{sj}$ ($m_{sj} = (i-1) \cdot IL + 1 + [j \cdot GR]$) to $m_{ej}$ ($m_{ej} = m_{sj} + IL - 1$). At each input pattern time m, the calculations shown in a block 13 in FIG. 8B are conducted in the DP matching unit 140. In this DP matching unit 140, the m-th frame of the input pattern and the j-th frame of the reference pattern of the n-th word are first read out, and the distance between R-th order vectors expressed by the foregoing equation (7) is determined by a distance calculating unit 141. Specifically, the distance $Dis(a_m, b_j^n)$ is obtained by consecutively reading out a number R of data in response to the signals from the input pattern buffer 120 and the reference pattern memory 130, as shown in FIG. 4, by determining the absolute values of the difference by an absolute data circuit 1411, and by determining the sum of the absolute values by an adder 1412 and an accumulator 1413. On the other hand, the minimum of three dissimilarities is determined concurrently with the distance calculations. Specifically, the values $g(m-1, j)$, $g(m-1, j-1)$ and $g(m-1, j-2)$, and the values $h(m-1, j)$, $h(m-1, j-1)$ and $h(m-1, j-2)$ are read out from the g memory 143 and the h memory 144, respectively, and are stored in registers G1, G2 and G3, and H1, H2 and H3, respectively. A comparator 1422 detects the minimum from the three registers G1, G2 and G3 and generates a gate signal $\hat{n}$ for selecting a register $H_{\hat{n}}$ (wherein $\hat{n}$ represents any of 1, 2 and 3) corresponding to a register $G_{\hat{n}}$ from which that minimum is derived. The content of the register $H_{\hat{n}}$ selected by the gate signal $\hat{n}$ is written in the location $h(m, j)$ of the h memory 144. Moreover, the minimum $g(m-1, j)$ outputted from the comparator 1422 and the distance $d(m, j)$ determined by the distance calculating unit 141 are added by an adder 1421 and are written in the location $g(m, j)$ of the g memory 143.

After the input pattern time m is changed from $m_{sj}$ to $m_{ej}$, in response to a signal SET4 from the control unit 240, the boundary values $g(m_{ej}, j)$ and $h(m_{ej}, j)$ in the (i+1)-th slant block, which are shown in a block 14 of FIG. 8B, are stored in the locations $G(p, n, j)$ and $H(p, n, j)$ of the G table memory 150 and the H table memory 160.

By executing the operations of the blocks 12, 13 and 14 of FIG. 8B thus far described until the reference pattern time j comes to the end $J^n$, the asymptotic calculations of the i-th slant block are processed. Next, in response to the signal m2 (which varies from $m_s=m_{so}+[J^n \cdot GR]$ to $m_e=m_s+IL-1$) generated from the control unit 240, comparisons are conducted, as shown in the upper one of block 15 of FIG. 8C. As shown in FIG. 5, specifically, in response to the signal m2 and the state q, the values T(m, q) and g(m, $J^n$) are read out from the T memory 2000 and the g memory 143, respectively, and are compared by a comparator 170. If T(m, q)>g(m, $J^n$), the values g(m, $J^n$), and n, p and h(m, $J^n$) are written in the T table memory 200 at location T(m, q), in an N table memory 190 at locations N(m, q), in a P table memory 180 at location P(m, q) and in an L table memory 210 at location L(m, q), respectively.

By the operations described above, the processings for the state p, the word n and the input pattern block i are ended. By sequencing the state designating signal p from $p_1$ to $p_e$, moreover, the processing for the word designating signal n is ended. By sequencing the word designating signal n from 1 to N, still moreover, the processing for the i-th slant block is ended.

After the input pattern block signal takes value I/IL, the decision process as expressed by the foregoing equations (9), (10) and (11) is started. A decision unit 220 is constructed as shown in FIG. 6. First of all, for the processing of a block 16 of FIG. 8D, the state q contained in the final state set F is consecutively designated in the automaton memory 230 in response to signal q3, and the value T(I, q) is read out from the T memory 200. The state $\hat{q}$ giving the minimum T(I, q) is determined by using a comparator 221, a minimum register 222 and a state register 223. Next, as the processing for a block 17 of FIG. 8D, a decision control unit 227 outputs address signals m3 and q as $q=\hat{q}$ and m=I to the N memory 190, the L memory 210 and the P memory 180 to read the values N(m, q), L(m, q) and P(m, q). Of these, the latter two values L(m, q) and P(m, q) give the subsequent time m and state q whereas the former value N(m, q) is outputted as the recognized result. By repeating these processings until the value $\hat{I}$ comes to zero, the recognized results are consecutively attained.

Although the construction of the present invention has been described hereinbefore in connection with the embodiments, the foregoing description should not limit the scope of the present invention. Especially, in the present invention, the equations (7) having the simplest form are used as the DP matching asymptotic equations. It is, however, conceivable to use another method using other equations of higher performance. For example, there can be conceived a method using the following equations:

$$g(m, j) = \min \begin{cases} g(m-2, j-1) + d(m-1, j) + d(m, j) \\ g(m-1, j-1) + d(m, j) \\ g(m-1, j-2) + d(m, j). \end{cases}$$

In this modified case, however, the values of the asymptotic equations and the distances have to be held till the time (m−2) and the time (m−1), respectively. This holding makes it necessary to additionally provide the table memory G(p, n, j). Although the recognitions are conducted on the basis of the distance, on the other hand, there can be conceived a method of recognizing on the basis of correlations. In this modified case, it is necessary to replace all the minimum detecting functions thus far described by the maximum detecting functions because the evaluating relationships are reversed. In the description thus far made, on the other hand, the table memories G(p, n, j) and H(p, n, j) are arranged in three-dimensional arrays as can be done in FORTRAN. Despite this fact, they may be memories which are designated by the state designating signal p, the word designating signal n and the reference pattern time j. In other words, the table memories need not have all the ranges (i.e., the table size=$p_{max} \times n_{max} \times j_{max}$) of the above values p, n and j but may have only the ranges (i.e., the table size=

$$\sum_{(p, n)\in\Delta} J^n)$$

that are be used. It should be understood that those apparent modifications naturally belong to the scope of the present invention, which is defined by the appended claims.

In the spoken word string recognition apparatus of the present invention, as has been described hereinbefore, the calculations are developed for each slant block defined in the form of a parallelogram which has the width of an input pattern IL frame in a time section defined by the input pattern time m and the reference pattern time j and which is inclined with respect to the reference pattern axis. Therefore, the present invention succeeds in eliminating the defect that no loop is allowed in the state transition of the automaton, while holding such an advantage that the memory access time is shortened. In other words, the spoken word string recognizing apparatus can enjoy an effect that the speech uttered in compliance with the various grammars can be recognized in a high percentage and at a high speed by executing the calculations for each slant block.

What is claimed is:

1. A pattern matching method comprising:
   a step of determining a distance d(m, j) between each feature vector $b_j^n$ of each of first through N-th reference patterns and a feature vector $a_m$ of an input pattern at each point (m, j) in the i-th slant block defined as a parallelogram which has a first side along an input pattern time axis equal to a block width IL and a second side inclined with respect to a time axis of said reference pattern and to said input pattern time axis, said block width being defined by a predetermined number of time points of said input pattern and being not longer than a length I of said input pattern, said input pattern being represented by a train of feature vectors arranged at said time points respectively, an n-th reference pattern having a length $J^n$ and being represented by a train of feature vectors arranged at time points j, where said n-th reference pattern is each of said first through said N-th reference patterns, and i being a block number ranging $1 \leq i \leq I/IL$ wherein IL indicates said block width;
   a step of conducting DP (dynamic programming) matching calculations for each of said slant blocks; and
   a step of setting boundary values at a slant line between an i-th slant block and an (i+1)th slant block as values which have been obtained by said DP matching calculations for the i-th slant block.

2. A pattern matching method according to claim 1, said step of conducting DP matching calculations being carried out along paths having a plurality of path gradients wherein said parallelogram has a gradient GR which is less than a maximum of said path gradients.

3. A pattern matching method according to claim 2, wherein the following relationship holds among said block width IL, the gradient GR and the length $J^n$ of the n-th reference pattern:

$$m_n\text{in}(J^n \cdot GR) + 1 > IL,$$

where the value ($J^n \cdot GR$) represents a maximum integer which is not greater than $J^n \cdot GR$.

4. A pattern matching apparatus for recognizing a string of spoken words, comprising:

an input unit for receiving an input speech and transforming said speech into a feature pattern of $A = a_1, a_2, \ldots, a_i, \ldots, a_I$ where $a_i$ is a feature vector;

a reference pattern memory for storing a n-th reference pattern of $B^n = b_1^n, b_2^n, \ldots, b_j^n, \ldots, b_{J^n}^n$ for a n-th word among a word set $\Sigma = \{n\}$ where $b_j^n$ is a feature vector;

an automaton memory for storing a state transition table including a first state 0 and a final state F, or for storing a set of combinations (p, q, n) indicating an occurrence of a state transition p→q when said word n appears in an input pattern as a recognized word sequence;

a T memory for storing a minimum accumulated distance T(m, q) at an input pattern time m and a state q which is the minimum of an accumulated distance calculated at the end time $J^n$ of the word of all the reference patterns which let the state transition be the state q;

N, P and L memories for storing in association with said T memory a word N(m, q) which is a word n giving the minimum accumulated distance T(m, q) at the state q and the input pattern time m, for storing a state P(m, q) which is a state p given by the word n giving said minimum accumulated distance T(m, q), and for storing a path value L(m, q) which is a starting point time of the word n giving said minimum accumulated distance T(m, q), respectively;

a G memory and an H memory for storing an accumulated distance G(p, n, j) and a path value H(p, n, j) at a time j of a n-th reference pattern on a p state on a boundary line between a present slant block and an immediately preceding slant block;

a distance calculating unit connected to receive signals from said input unit and said reference pattern memory for calculating a distance d(m, j) between each feature vector $b_j^n$ of a n-th reference pattern and the feature vector $a_m$ of the input pattern corresponding to each point (m, j) of an i-th slant block defined in the form of a parallelogram which has the width of an input pattern frame IL as a first side along an input pattern time axis and which has a second side inclined with respect to a reference pattern time axis and said input pattern time axis;

a DP (dynamic processing) matching unit responsive to said distance calculating unit and operative to interact with said G memory, said H memory, and said T memory for calculating accumulated distance g(m, j) and a path value h(m, j) at the input pattern time m and at the reference pattern time j in said i-th slant block by using DP equations under the boundary conditions g(m−1, 0) equals the value of said minimum accumulated distance T(m−1, p) and g(m−$m_{sj}$−1, j) equals the value of said accumulated distance G(p, n, j) and h(m−$m_{sj}$−1, j) equals the value of said path value H(p, n, j), which are designated in accordance with the state p, the word n, and the reference pattern time j, and for storing said accumulated distance g(m−$m_{ej}$, j) and said path value h(m−$m_{ej}$, j) into said G memory as G(p, n, j) and said H memory as H(p, n, j), respectively, as the results of DP equations at the boundary between the i-th slant block and the (i+1)-th slant block, where m(sj) and m(ej) are indicative of m(sj)-th through the m(ej)-th input feature vectors;

a comparator responsive to said DP matching unit for determining a minimum accumulated distance T(m, q) among values of accumulated distance g(m, j=$J^n$) whose word n transits a state to q and, for storing said minimum accumulated distance in said T memory at T(m, q), and for storing the word designation n, the state designation p and the path value h(m, j=$J^n$), which give said minimum, in said N, P and L memories as N(m, q), P(m, q) and L(m, q), respectively;

a control unit connected to read said set of combinations (p,q,n) for generating signals of said input pattern time m, said slant block number i, said word designation n, said state designations p and q, and said reference pattern time j and to provide said designations selectively to said memories (G,H,P,N,T,L); and a decision unit connected to read said P, N, T, L memories and responsive to said automaton memory for determining the minimum T(m, q) at an input end time M=I under a state q contained in said final state group F, and for getting a recognized result by referencing said P, N and L memories.

* * * * *

UNITED STATES PATENT AND TRADEMARK OFFICE
CERTIFICATE OF CORRECTION

PATENT NO. : 4,901,352

DATED : February 13, 1990

INVENTOR(S) : Masao Watari

It is certified that error appears in the above-identified patent and that said Letters Patent is hereby corrected as shown below:

Col. 1, line 66, delete "automation" and insert --automaton--.

Col. 4, line 7, delete "$\hat{1}$" and insert --$\hat{\ell}$--;

Col. 4, line 22, delete "1> 0" and insert --$\ell > 0$--;

Col. 4, line 23, delete "m = $\hat{1}$. If $\hat{1}$ = 0" and insert --m = $\hat{\ell}$. If $\hat{\ell}$ = 0--;

Col. 7, line 28, delete "in" and insert --is--;

Col. 7, line 52, delete "$p_3$" and insert --$p_e$--;

Col. 9, line 43, delete "$\hat{1}$" and insert --$\hat{\ell}$--;

Col. 11, line 23, delete "$b_j^n,\ldots,b_j^n$" and insert --$b_j^n,\ldots,b_J^n$--.

Signed and Sealed this

Twenty-third Day of July, 1991

Attest:

HARRY F. MANBECK, JR.

*Attesting Officer*     *Commissioner of Patents and Trademarks*